2,582,853

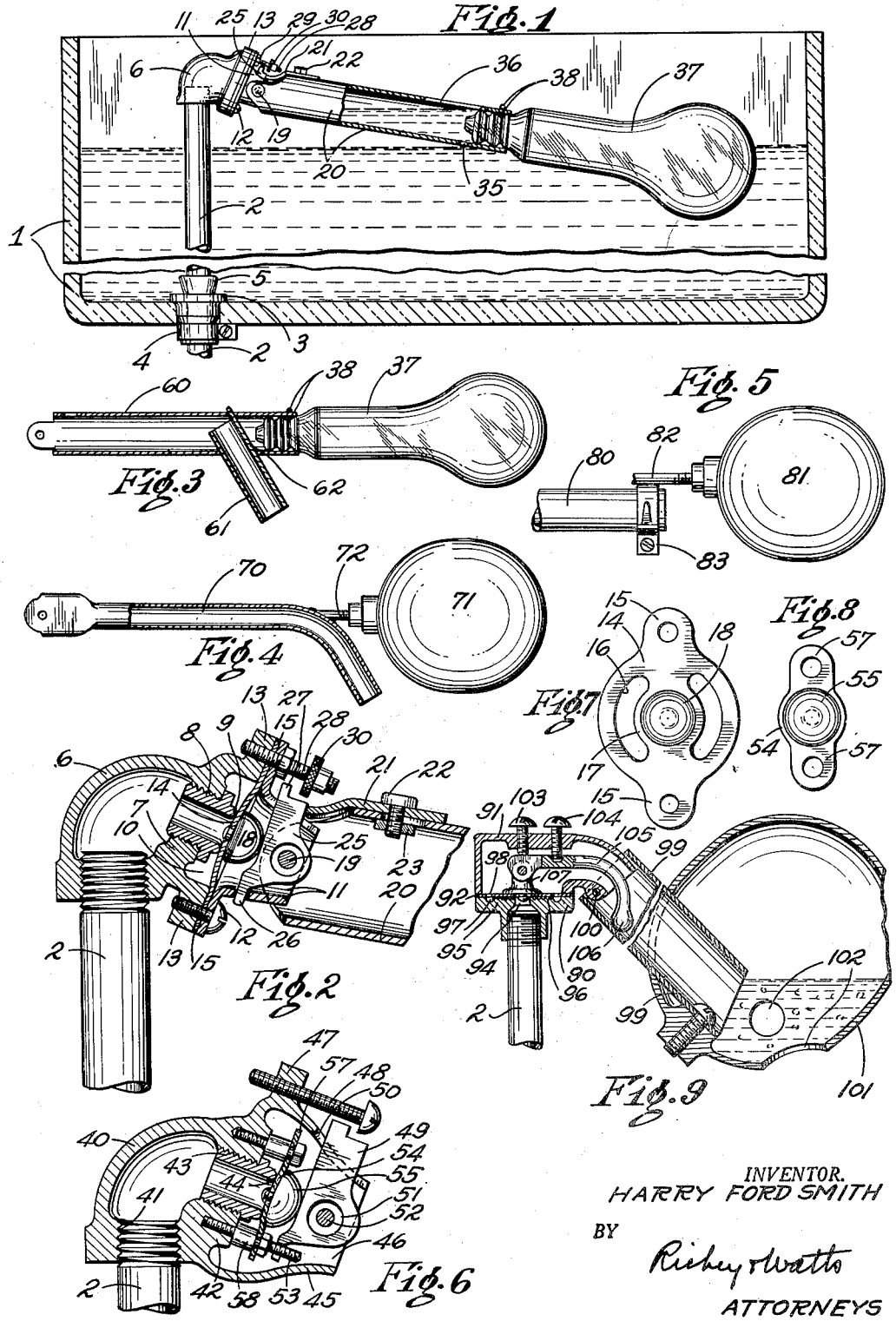
Jan. 15, 1952 — H. F. SMITH — 2,582,853
INLET FLOAT VALVE FOR FLUSH TANKS
Filed Aug. 17, 1944
INVENTOR.
HARRY FORD SMITH
BY
Richey & Watts
ATTORNEYS Patented Jan. 15, 1952

UNITED STATES PATENT OFFICE 2,582,853

INLET FLOAT VALVE FOR FLUSH TANKS

Harry Ford Smith, Lexington, Ohio, assignor to Mansfield Sanitary Pottery Inc., Perrysville, Ohio, a corporation of Ohio Application August 17, 1944, Serial No. 549,865

11 Claims. (Cl. 137—104)

This invention relates generally to flush tanks and particularly to new and improved inlet control means for such tanks.

Heretofore many efforts have been made to control the inlet of water to flush tanks so that noise could be kept to the minimum, the inlet valve would be closed suddenly and completely, the valve wear could be minimized so that valves could be used for long periods of time, and the syphoning of water out of the tank could be prevented. The many expedients proposed to accomplish these desires were embodied in apparatus which became more and more complicated as time went on and yet, so far as I know, those objects were never satisfactorily obtained. The present invention attains all these objects and the additional object of employing a minimum amount of critical materials, and does so by quite simple, inexpensive and unique apparatus.

In the drawings accompanying and forming a part of this specification,

Figure 1 is a fragmentary, vertical cross-sectional view, partly in elevation, of a flush tank and apparatus embodying one form of the present invention;

Figure 2 is an enlarged view of parts of Fig. 1;

Figures 3, 4 and 5 are vertical cross-sectional views, partly in section, of modified forms of the float arm of Fig. 1;

Figure 6 is a vertical cross-sectional view of a modified form of the inlet valve of Fig. 1;

Figure 7 is a side elevational view of the combined valve and gasket of Figs. 1 and 2;

Figure 8 is a side elevational view of the valve mounting of Fig. 6; and,

Figure 9 is a side elevational, partly sectional, view of another embodiment of the present invention.

In Fig. 1 the flush tank 1 has a hole in its bottom wall thru which a service water pipe 2 extends to a point at least about 1" above the desired high level of water in the tank. An annular rubber seal 3 surrounds pipe 2 and projects thru the hole in the bottom of the tank and is clamped in liquid sealing contact against the pipe by any suitable means, for example, a hose clamp 4. A tubular wedge 5 of any suitable material, when forced into place between pipe 2 and seal 3, serves to force the seal against the walls of the hole and thereby prevent leakage of water out of the tank.

An elbow 6 is screw-threaded onto the upper end of inlet pipe 2. (See Figs. 1 and 2.) This elbow is preferably more than a 90° elbow, so that it may discharge water downwardly at an acute angle to the surface of water in the tank. The elbow is hollow and preferably has a transverse wall 7 between its inlet and outlet ends in which a tube 8 is screw-threaded. This tube has an annular valve seat 9. The elbow is provided with an annular space 10 around the valve seat 9. The outlet end of elbow 6 comprises a detachable tube 11 which is secured to elbow 6 by any suitable means, such as a screw 12 passing thru the flange on tube 11 and threaded into one of the ears 13 of valve 6. A gasket 14 is interposed between elbow 6 and tube 11. As is better shown in Fig. 7, this gasket is generally circular in outline with oppositely projecting ears 15 provided with holes thru which screw 12 and stud 28 may pass, and with arcuate shaped openings 16 thru which water may flow from the annular space 10 into and thru tube 11. The gasket carries at its midpoint a valve-seating button 18 by which the diaphragm portion of the gasket may be pressed into valve-closing contact with valve seat 9.

A pin 19 extends horizontally thru the walls of tube 11 near its discharge end and pivotally supports thereon a hollow float arm 20 which surrounds but is spaced apart from the outlet end of tube 11. The float arm 20 is slotted lengthwise on its upper side and is provided with an endwise adjustable slide 21 which may be secured in adjusted position, as by bolt 22 which extends thru the slot, and is threaded into a nut 23 inside the arm. By loosening the bolt 20, the slide 21 may be positioned relative to the float arm and the valve actuating lever about to be described.

Valve lever 25 is flat and has a reduced lower end lug 26 which extends thru a retaining hole in tube 11 and its upper end projects thru a longitudinal slot in tube 11 and has a reduced extension 27. The stud 28 extends thru the flange of tube 11 and is threaded into the adjacent ear 13 of elbow 6 and carries a nut 29 which presses against the flange of tube 11. The stud also carries an adjustable nut 30 which is engageable with extension 27 of lever 25, the movement of that lever being within the space between nut 30 and the closed end of the slot in tube 11. When pressure is exerted by slide 21 on lever 25, the lever will pivot about extension 26 and force the opposite edge of the lever against button 18 and thereby press the diaphragm 17 into liquid sealing contact with valve seat 9. Pivot pin 19 which passes thru an enlarged opening in lever 25 helps to maintain the lever in operative assembled position.

Float arm 20, as shown in Fig. 1, is a hollow tube into which water flowing thru passages 16 in gasket 14 may enter at its pivoted end. Near its free end this arm has a bleeder opening 35 thru its under side and an overflow opening 36 thru its upper side. A float 37 is secured in the free end of the arm. As shown, float 37 is a used electric light bulb which is maintained in place by engagement of the threads of the base of the tube with a piece of wire 38 which extends along the inner surface of the tube for a short distance with the ends projecting thru holes in the walls of the arm. The wire is arranged spirally at an angle comparable to the inclination of the threads on the bulb base to act as a companion thread.

The above described apparatus operates, as follows:

Figures 1 and 2 illustrate the position the parts occupy from the time the flow of liquid thru inlet pipe 2 is shut off by engagement of diaphragm 17 with valve seat 9 and until the flush valve (not shown) is opened. As the water level in tank 1 falls, following the opening of the flush valve, the float ball 37 falls with the level of the liquid, thereby pivoting float arm 20 about pivot pin 19 and releasing the pressure exerted by lever 25 on button 18. Thereupon water under pressure in inlet pipe 2 flows thru member 8, between valve seat 9 and diaphragm 17, into the annular space 10, thence thru openings 16 in gasket 14 and discharges thru tube 11 into float arm 20. As the float 37 continues to move down in the tank, lever 25 moves toward and finally abuts against nut 30 where it may still engage button 18 and prevent excessive deformation of diaphragm 17. Since the water discharged from the elbow 6 into float arm 20 exceeds the capacity of bleeder opening 35, the excess water quickly fills the float arm until it reaches the overflow opening 36, whereupon it flows out into the tank. Thus, the flow of water into float arm 20, and out of the arm, into the tank is relatively quiet. When the flush valve is closed and the level of liquid in the tank rises, float 37 pivots float arm 20 toward a horizontal position with consequent increase in the quantity of water retained in the arm. When the slide 21 on the pivoted end of arm 20 engages the adjacent edge of lever 25, as the float arm rises, lever 25 presses against button 18 and moves diaphragm 17 toward valve seat 9 with consequent reduction in the volume of water flowing out of inlet pipe 2. When this volume has been reduced to less than the volume which can flow thru bleeder passage 35, the head of water in the float arm 20 will decrease with resultant decrease in weight of the float arm. This reduction of weight permits the float 37 to rise quickly to a higher point with respect to the water level in the tank and this sudden rise is effective in quickly seating diaphragm 17 against valve seat 9 and thereby suddenly cutting off the flow of water thru member 8 and elbow 6. This sudden closing action eliminates some of the noise characteristic of other devices, prolongs the length of life of the diaphragm 17 and valve seat 9 and avoids the extremely small rate of decrease of water flow just before full closure of the valve, as is characteristic of certain prior devices.

Fig. 6 shows a modified form of elbow. In this instance the elbow 40 is an integral member having a screw threaded opening 41 to thread onto the outlet end of inlet pipe 2, a partition 42 extending thereacross between its inlet and outlet ends, a tube 43 screw-threaded in an opening in partition 42 and provided with an annular valve seat 44, and an annular wall 45 defining an annular space around the valve seat 44 and an outlet opening 46. The upper side of elbow 40 has an extension 47 threaded to receive an adjusting bolt 48 to limit the movement of valve-operating lever 49 which projects thru a slot 50 in the upper part of wall 45. This lever 49, which is quite like lever 25, has an enlarged hole 51 thru which may pass pivot pin 52 on which a float arm such as arm 20 of Fig. 1 may be mounted. The lower end of lever 49 projects into an opening in an extension of stud 53 which acts as an anchor or pivot for the lever. The valve for elbow 40 comprises a flexible diaphragm 54, as is better shown in Fig. 8. This diaphragm carries a button 55 on one side to engage against an edge of lever 49 and is provided with perforated ears 57 to seat on necked portions of studs 58 which are mounted in the partition 42.

When the float arm associated with elbow 40, as for example that shown at 20 in Fig. 1, pivots about pin 52 toward a vertical position, the pressure of water in pipe 2 will move diaphragm 54 away from valve seat 44, thereby permitting water under pressure to enter the space surrounding the valve seat, to flow past the diaphragm and out thru the nozzle end 46 of the elbow. When the float arm is pivoted about pin 52 toward a horizontal position, an adjustable slide, like 21 of Fig. 1, will engage the adjacent side of lever 49 and press the lever against button 55 and thereby press the diaphragm 54 with liquid sealing contact against valve seat 44, substantially as described above in connection with Fig. 1.

Fig. 3 shows a modified form of float arm. In this instance the arm 60 generally resembles arm 20 of Fig. 1 but is provided with a downwardly projecting tube 61 near its float carrying end to permit liquid to flow out from the interior of the arm. The discharge end of tube 61 will be submerged thruout substantially all the tank flushing and filling cycles and thus any noise caused by the incoming water which might be present in the apparatus of Fig. 1 may be reduced somewhat by using the arm of this Fig. 3. Tube 61 has a bleeder opening 62 thru which may flow water which is in the float arm 60 and which cannot flow directly out thru tube 61. The float 37 of float arm 60 is a used electric light bulb like that shown in Fig. 1 and the bulb is preferably held in place by means shown for that purpose in Fig. 1.

Fig. 4 shows another modified form of hollow float arm. In this case the arm 70 is bent downwardly at a point near its free end, thereby resembling in certain respects the float arm of Fig. 3. The float 71 of this arm is a hollow ball screw-threaded to a stud 72 which is attached to the bend of the arm. In this instance the float arm 70 is not provided with separate overflow and bleeder openings and, therefore, the arm does not retain a certain volume of water until shortly before final closing of the inlet valve as do the arms of Figs. 1 and 3.

Fig. 5 shows another modification of hollow float arm and float ball. In this instance the float arm 80 is a straight tube open at its free end. A hollow float ball 81 is screw-threaded to a stud 82 which is connected to a clamp 83 which surrounds and grips tube 80.

It will be understood that each of the hollow float arms shown and described herein is open to the atmosphere at the pivoted end. As a result, the water in the tank cannot be syphoned out when pressure on the inlet pipe 2 decreases.

The device shown in Fig. 9 is quite similar in most respects to the apparatus of Figs. 1, 2 and 6. However, it differs therefrom in certain particulars.

The valve body comprises an inlet portion 90, an outlet portion 91 and a gasket 92 between those portions and embodying a central valve portion. Inlet portion 90 is threaded to be screwed onto the outlet end of a service pipe 2 and has a liquid passage 94 therethru and a valve seat 95 around that passage. This seat has a radially wide face and the face is provided with a plurality of alternate ridges and grooves as indicated at 96. These ridges and grooves extend circumferentially of the face and some extend preferably spirally thereof. The valve gasket is composed of deformable material so as to receive the ridges and fill the grooves of the valve seat when the valve is closed. An annular space 97 surrounds valve seat 95 and communicates thru apertures 98 in the gasket and valve with the interior of the outlet portion 91 of the valve body. A hollow float arm 99 is pivoted at 100 to the outlet portion of the valve body and may swing upwardly or downwardly depending on the liquid level in the flush tank. The float arm is open at its upper end to receive liquid passing thru the valve body from inlet pipe 2 and at its lower end extends into float ball 101 where it has an open end to deliver liquid into the ball. The lower portion of ball 101 is provided with a plurality of holes 102 to permit liquid to escape therefrom into the tank. Adjusting screws 103 and 104 extend into the interior of the outlet portion 91 of the valve body and are engageable with a lever 105 which at one end is engageable with the inner surface of the float arm as at 106, and at the other end is pivotally connected to metal member 107 which backs up and is connected to the valve portion of gasket 92. Between its ends lever 105 is recessed to receive the end of screw 104 about which lever 105 may swing or move in response to pressure exerted thereon by float arm 99 or in response to liquid pressure exerted on the valve when the float arm is swinging downwardly. Adjustment of screw 104 will vary the amount of such movement of lever 105 while adjustment of screw 103 will limit the upward movement of member 107 and may also be used to close the valve when the float arm is to be removed.

The operation of the apparatus of Fig. 9 is quite like that previously described for Figs. 1, 2 and 6. However, it will be understood that when liquid in the tank is at the desired level the valve will be seated against seat 95 and communication between inlet passage 94 and annular space 97 will be broken. When the tank is flushed and arm 99 swings downwardly, the arm will relieve the upward pressure on lever 105 and the pressure of water in inlet pipe 2 will move lever 105 about screw 104 whereupon communication between inlet passage 94 and annular space 97 will be made and liquid will flow thru the valve body, hollow arm 99, float ball 101 and into the tank. As the level of liquid rises in the tank the arm 99 will swing upwardly due to the buoyancy afforded by air entrapped in the upper trap of ball 101. Such upward swinging movement will exert pressure upwardly on the end of lever 105 causing it to move about the end of screw 104 and thereby moving member 107 and the valve toward valve seat 95. Any air entrapped in the liquid entering ball 101 may escape through the liquid and add to the buoyancy of the ball 101, thereby tending to increase the force exerted by arm 101 on lever 105. As the valve approaches the seat 95 progressively closer and closer the amount of liquid flowing from inlet passage 94 into annular space 97 will decrease and due to the several grooves and ridges on the valve seat the pressure on the liquid will be spread more or less equally over those several grooves and ridges so that the pressure per square inch on the valve seat may be considerably less than the pressure in the inlet pipe. For example, if there are five sets of grooves and ridges on the valve seat and there is a pressure of 100 pounds per square inch on the water in pipe 2, the pressure per square inch on the outermost groove or ridge will be only about 20 pounds. Thus, the average pressure on the valve seat may be something like 40 or 50 pounds instead of 100 pounds per square inch. When the grooves and ridges are spiral instead of concentric there may be an even greater decrease in pressure because the water may flow in the spiral grooves instead of over the tops of the ridges.

This decrease of pressure as the valve moves progressively closer to its seating position, together with the buoyancy of float 101 which increases progressively as the float arm rises, results in considerably accelerated movement of the valve toward its seat in the latter stages of the seating operation. Furthermore, the grooves and ridges on the valve seat greatly minimize the noise which is so prevalent near the end of the valve closing operation in many of the prior flush tanks. Indeed, the decrease in volume of such noise is so pronounced with the apparatus of Fig. 9 that the escape of entrapped air from liquid flowing in the hollow float arm can be heard. However, the float ball 101 substantially silences even the small volume of noise traceable to such escape of entrapped air.

It will be understood that, if desired, the seats 9 and 44 of Figs. 2 and 6, respectively, may be extended radially and provided with grooves and ridges such as are shown in Fig. 9 on the face of the valve seat. It will be understood that when any such change of seats 9 or 44 is made members 18 and 55, respectively, should be correspondingly extended so as to be sure of full engagement of the valve with the seat and to make or break the communication between the inlet passage thru members 8 and 43 and the annular spaces surrounding the valve seat in the valve body.

Having thus described my invention so that others skilled in the art may be able to understand and practice the same, I state that what I desire to secure by Letters Patent is defined in what is claimed.

What is claimed is:

1. A float arm, for use in a flush tank, said arm being hollow and having at one end a liquid inlet and a constantly open uncontrolled air inlet and having a constantly open air and liquid outlet near its other end, pivot means near the inlet end of said arm for supporting the arm, and pivoted means partly surrounded by the inlet end of said arm and engageable with said arm and with a valve controlling said liquid inlet, said pivoted means serving when moved by pivoting movement of said arm in one direction to close said valve.

2. A flush tank inlet valve comprising a hollow body having a liquid passage therethru, a valve seat around said passage, an annular space around said seat and an outlet for liquid flowing from said space, a flexible diaphragm constituting a valve for said seat and interposed between said seat and said outlet, said diaphragm having openings therethru communicating with said annular space, a float lever pivotally attached to said body, and means actuated by movement of said lever to press said diaphragm against said seat.

3. A flush tank inlet valve comprising a hollow body having a liquid passage therethru, a valve seat around said passage, said seat having a plurality of spiral ridges and grooves in its face, an annular space around said seat in said body, an outlet for liquid flowing from said space, a valve member engageable with said seat and serving to make and break communication between said passage and annular space, a float lever pivotally attached to said body, and means actuated by movement of said lever to move said valve member into engagement with said seat.

4. A flush tank inlet valve comprising a hollow body having a liquid passage therethru, an annular valve seat around said passage, a plurality of spiral ridges around said seat, an annular space around said seat in said body, an outlet for liquid flowing from said space, a flexible diaphragm engageable with said seat and serving to make and break communication between said passage and annular space, a float lever pivotally attached to said body, and means actuated by movement of said lever to press said diaphragm against said annular seat and said spiral ridges.

5. In a flush tank, an inlet pipe, a valve body comprising inlet and outlet portions, said inlet portion being secured to the outlet end of said pipe and having an inlet passage surrounded by an annular valve seat and a spiral ridge therearound, and having an annular space around said valve seat, a gasket member between said inlet and outlet portions and having flow passages therethrough and embodying a valve for said seat, to make or break communication between said inlet passage and said annular space, and means for actuating said valve including a hollow float arm pivoted to said valve body outlet portion and telescopically receiving the latter portion therewithin and a lever within said outlet portion and operatively associated with said arm and valve to permit unseating of the valve when the float arm swings downwardly and to seat the valve when the arm swings upwardly.

6. In a flush tank, an inlet pipe having an opening at one end, a valve for said opening, a hollow float arm telescopically receiving said end therewithin and pivotally connected thereto, and valve actuating means disposed in the pipe end between the valve and arm and actuatable by pivotal movement of the arm to seat said valve in said opening, said arm being constantly open to the atmosphere at its pivoted end to admit air and water and constantly open near its opposite end to permit the escape of fluid therefrom.

7. In a flush tank, an inlet pipe having an opening at one end, a valve for said opening, a hollow float arm telescopically receiving said end therewithin and pivotally connected thereto, valve actuating means disposed in the pipe end between the valve and arm and actuatable by pivotal movement of the arm to seat said valve in said opening, said arm being constantly open to the atmosphere at its pivoted end to admit air and water and constantly open near its opposite end to permit escape of fluid therefrom, and a float connected to the same arm near its outlet end.

8. In a flush tank, an inlet pipe having an opening at one end, a valve for said opening, a hollow float arm telescopically receiving said end therewithin and pivotally connected thereto, valve actuating means disposed in the pipe end between the valve and arm and actuatable by pivotal movement of the arm to seat said valve in said opening, said arm being constantly open to the atmosphere at its pivoted end to admit air and water and constantly open near its opposite end to permit escape of fluid therefrom, and deflecting means disposed adjacent to the open end of the inlet pipe to direct into the adjacent end of the said arm liquid flowing out of said pipe.

9. In a flush tank, an inlet pipe having an opening at one end, a valve for said opening, a hollow float arm telescopically receiving said end therewithin and pivotally connected thereto, valve actuating means disposed in the pipe end between the valve and arm, said arm having an inlet constantly open to the atmosphere at its pivoted end to admit air and liquid and having a constantly open outlet near its opposite end to permit escape of fluid beneath the surface of liquid in said tank, and means cooperating with said float arm and valve actuating means for limiting the extent of upward swinging movement of the arm and maintaining said outlet beneath the level of liquid in the tank at substantially all times.

10. In a flush tank, an inlet pipe having an opening at one end, a valve for said opening, a hollow float arm telescopically receiving said end therewithin and pivotally connected thereto, valve actuating means disposed in the pipe end between the valve and arm, said arm having an inlet constantly open to the atmosphere at its pivoted end to admit air and liquid and having a constantly open outlet near its opposite end to permit escape of fluid beneath the surface of liquid in said tank, and adjustable means cooperating with said float arm for limiting the extent of upward swinging movement thereof.

11. In a flush tank, an inlet pipe having an opening at one end, a valve for said opening, a hollow float arm telescopically receiving said end therewithin and pivotally connected thereto, valve actuating means disposed in the pipe end between the valve and arm, said arm having an inlet constantly open to the atmosphere at its pivoted end to admit air and liquid and having a constantly open outlet near its opposite end to permit escape of fluid beneath the surface of liquid in said tank, and adjustable means cooperating with the said valve actuating means and float arm for controlling the extent of movement of the valve actuating means and valve.

HARRY FORD SMITH.

REFERENCES CITED

The following references are of record in the file of this patent:

UNITED STATES PATENTS

| Number | Name | Date |
|---|---|---|
| 509,401 | Scott | Nov. 28, 1893 |
| 788,485 | Lytton | Apr. 25, 1905 |
| 1,187,773 | Oldham | June 20, 1916 |
| 1,690,057 | Coleman | Oct. 30, 1928 |
| 1,692,289 | Damgaard | Nov. 20, 1928 |
| 1,710,877 | Kaye | Apr. 30, 1929 |
| 1,983,213 | Brady | Dec. 4, 1934 |
| 2,157,881 | Andreasen | May 9, 1939 |
| 2,208,181 | Eggleston | July 16, 1940 |
| 2,289,905 | Dasher | July 14, 1942 |

FOREIGN PATENTS

| Number | Country | Date |
|---|---|---|
| 12,710 | Great Britain | of 1898 |
| 503,302 | Germany | of 1930 |